United States Patent
Callinan et al.

(10) Patent No.: US 7,300,700 B2
(45) Date of Patent: Nov. 27, 2007

(54) CATIONIC MICROSPHERES AND METHOD OF MAKING CATIONIC MICROSPHERES

(75) Inventors: Andrew J. Callinan, Shoreview, MN (US); Jason D. Romsos, Hudson, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 441 days.

(21) Appl. No.: 10/725,634

(22) Filed: Dec. 2, 2003

(65) Prior Publication Data

US 2005/0118416 A1    Jun. 2, 2005

(51) Int. Cl.
*C09J 9/00*     (2006.01)
*C09J 7/04*     (2006.01)
*C09J 7/02*     (2006.01)

(52) U.S. Cl. .................. 428/355 RA; 428/355 AC; 526/278; 526/287; 526/307; 526/307.7; 526/312; 526/320; 523/218; 523/223

(58) Field of Classification Search ......... 428/355 RA, 428/355 AC; 526/278, 287, 307, 307.7, 526/312, 320; 523/223, 218
See application file for complete search history.

(56) References Cited

U.S. PATENT DOCUMENTS

| | | | |
|---|---|---|---|
| 3,691,140 A | | 9/1972 | Silver |
| 3,857,731 A | * | 12/1974 | Merrill et al. ........... 428/314.4 |
| 4,166,152 A | | 8/1979 | Baker et al. |
| 4,598,112 A | | 7/1986 | Howard |
| 5,756,625 A | | 5/1998 | Crandall et al. |
| 2003/0175503 A1 | * | 9/2003 | Lucast et al. ............... 428/343 |

FOREIGN PATENT DOCUMENTS

| | | |
|---|---|---|
| DE | 10215656 | 10/2003 |
| JP | 8225704 | 9/1996 |

* cited by examiner

*Primary Examiner*—Daniel Zirker (57) ABSTRACT

An adhesive composition that incorporates cationic microspheres and a fluidizing medium effective for supporting application of the adhesive composition to a substrate.

49 Claims, 1 Drawing Sheet

CATIONIC MICROSPHERES AND METHOD OF MAKING CATIONIC MICROSPHERES

CROSS-REFERENCE TO RELATED APPLICATION(S)

NONE

BACKGROUND OF THE INVENTION

The present invention generally relates to repositionable pressure sensitive adhesives. More specifically, the present invention relates to repositionable pressure sensitive adhesives exhibiting enhanced adhesion to a variety of application surfaces, including, but not limited to, rough surfaces, textured surfaces, or any surface exhibiting challenging adhesion characteristics, whether vertically-oriented, horizontally-oriented, or having both a vertical orientation component and a horizontal orientation component.

Repositionable pressure sensitive adhesives (also referred to herein as "repositionable PSA"s) are commonly used for attachment of temporary signage and messaging products at a variety of locations, such as home and office environments. Adhesion to a variety of application surfaces without premature detachment is a desirable property of repositionable PSAs. On the other hand, the capability of being cleanly removable from application surfaces without leaving adhesive residues on the application surfaces is a desirable property of repositionable PSAs, as well. Adhesive properties that allow numerous, repeated, re-applications to application surfaces are also desirable property for repositionable PSAs.

Elastomeric microspheres are a commonly used component of repositionable PSAs that assist with obtaining these desired characteristics of repositionable PSAs. Continuing investigations have been directed to enhancing adhesion of repositionable PSAs to application surfaces by modifying the rheology and/or chemistry of repositionable PSAs. These investigations have primarily focused on substitution of different components and/or addition of new components to modify prior repositionable PSA formulations.

One area of investigation of interest concerns creation of a repositionable pressure sensitive adhesive that exhibits enhanced adhesion when applied to challenging application surfaces other than smooth paper surfaces and minimized adhesive residue remaining on the application surfaces upon removal of repositionable adhesive articles that include the repositionable pressure sensitive adhesive. Some examples of application surfaces exhibiting challenging adhesion characteristics, include, but are not limited to, rough surfaces, textured surfaces, and charged surfaces.

The present invention provides both elastomeric microspheres and repositionable pressure sensitive adhesives that desirably possess enhanced adhesion. This holds true for both application surfaces where existing repositionable pressure sensitive adhesives perform satisfactorily, as well as, for application surfaces exhibiting more challenging adhesion characteristics.

BRIEF SUMMARY OF THE INVENTION

Figure 1:
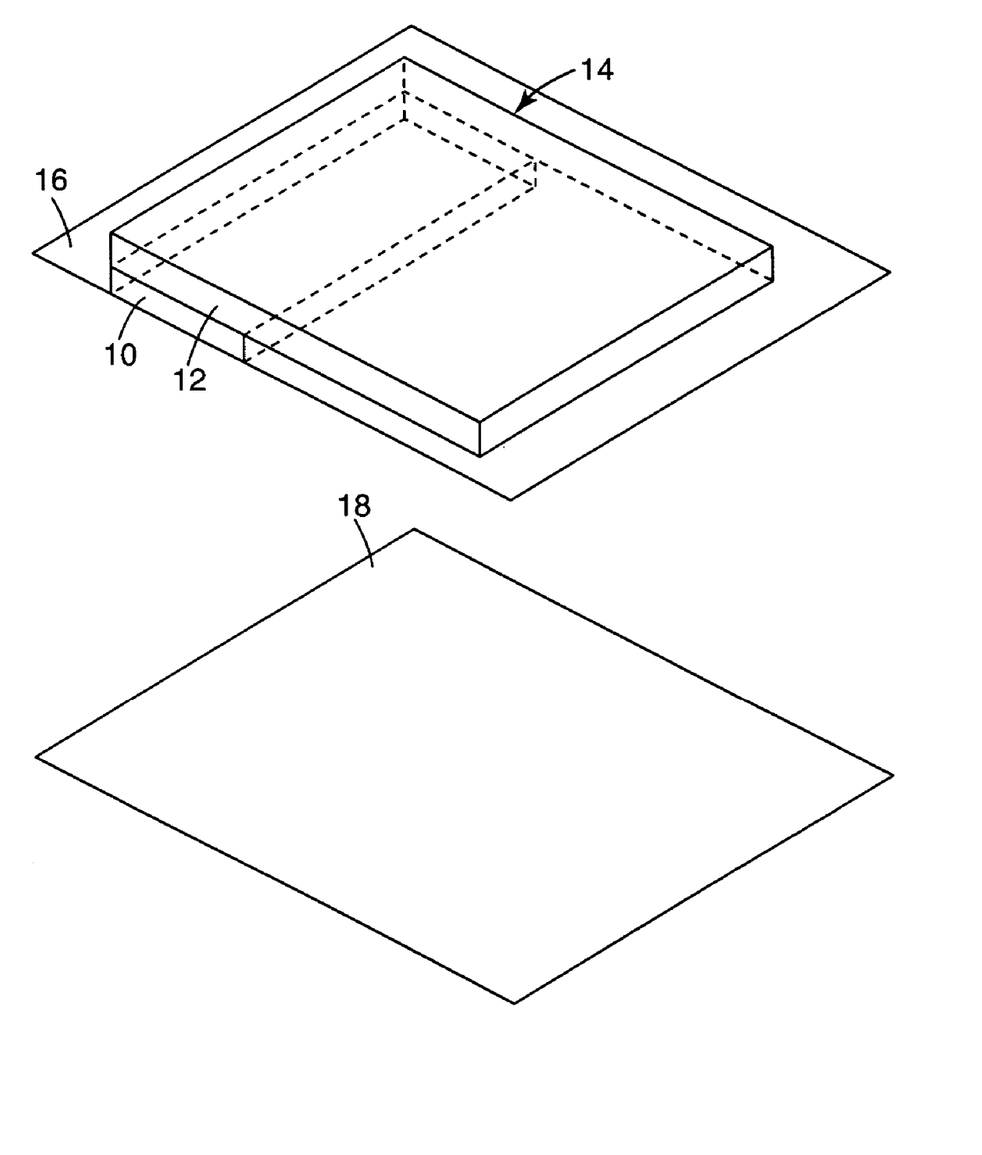
The FIGURE is an isometric view of a repositionable adhesive article that includes a repositionable pressure sensitive adhesive in accordance with the present invention.

The present invention encompasses a pressure sensitive adhesive composition that incorporates cationic microspheres and a fluidizing medium that is effective for supporting application of the pressure sensitive adhesive composition to a substrate. Additionally, the present invention includes a mixture of polymerizable substances that, when polymerized, forms the cationic microspheres. The present invention further includes a repositionable pressure sensitive adhesive and a method of making the repositionable pressure sensitive adhesive. The present invention also encompasses repositionable adhesive articles that incorporate a substrate and a coating of the repositionable pressure sensitive adhesive on the substrate.

DETAILED DESCRIPTION

The present invention generally relates to repositionable pressure sensitive adhesives. More specifically, the present invention relates to repositionable pressure sensitive adhesives that incorporate cationic polymeric elastomeric microspheres. The cationic polymeric elastomeric microspheres and the repositionable pressure sensitive adhesives that incorporate the cationic polymeric elastomeric microspheres desirably possess enhanced adhesion characteristics and minimized adhesive residue on the application surfaces upon removal of repositionable adhesive articles that include the repositionable pressure sensitive adhesive. This holds true for both application surfaces where existing repositionable pressure sensitive adhesives perform satisfactorily, as well as, for application surfaces exhibiting more challenging adhesion characteristics.

Cationic polymeric elastomeric microspheres (also referred to herein as "cationic microspheres") that are produced in accordance with the present invention are a reaction product of certain polymerizable substances. The polymerizable substances include at least one $C_4$-$C_{14}$ alkyl (meth) acrylate monomer and one or more cationic unsaturated vinyl comonomers. The polymerizable substances may optionally also include one or more other unsaturated vinyl comonomer(s) in addition to the cationic unsaturated vinyl comonomer(s).

The polymerizable substances are included as part of a reaction mixture in the course of preparing the cationic microspheres. In addition to the polymeric substances, the reaction mixture also includes one or more catalyzation initiators. The reaction mixture will typically also include a fluidizing medium, such as deionized water, and a surfactant, such as a cationic surfactant. The reaction mixture may optionally also include any desired polymeric stabilizer(s) (having non-ionic form and/or cationic form). Furthermore, the reaction mixture may optionally include one or more modifiers, such as rheology agent(s), chain transfer agent(s), solvent(s), and any of these in any combination, to beneficially optimize the cationic microspheres or formation of the cationic microspheres.

The reaction mixture is subjected to appropriate conditions that facilitate polymerization of the polymerizable substances to form a reaction product. The reaction product, which is also referred to herein as an intermediate adhesive composition, includes the cationic polymeric elastomeric microspheres that are suspended in the fluidizing medium, such as deionized water. Upon filtration that typically removes a very small amount of globular matter, the reaction product is transformed into a purified cationic microsphere composition. This purified cationic microsphere composition is then compounded with an adhesive binder, such as a cationic latex adhesive binder, to form a coating mixture (i.e., the repositionable pressure sensitive adhesive). The coating mixture may optionally also include any desired optional modifier(s). Some examples of potential modifiers that may optionally be included in the coating mixture include solvent(s), tackifying agent(s), plasticizer(s), rheology modifier(s), antioxidant(s), and any combination of any of these.

As used herein, the term "(meth)acrylate" refers to both acrylate and methacrylate. Exemplary $C_4-C_{14}$ alkyl(meth) acrylate monomers that may be employed in the cationic microsphere synthesis are mono-functional, unsaturated (meth)acrylate esters with alkyl groups having from 4 to 14 carbon atoms. Such alkyl(meth)acrylates are oleophilic, water dispersible, and essentially water insoluble. Useful $C_4-C_{14}$ alkyl(meth)acrylates of particular interest would, as homopolymers, generally have a glass transition temperature below about $-20°$ C. If a combination of different alkyl(meth)acrylate monomers is used, such a combination would produce a copolymer or terpolymer generally having a glass transition temperature below $-20°$ C. Some non-exhaustive examples of suitable alkyl(meth)acrylates include, but are not limited to, isooctyl acrylate, 4-methyl-2-pentyl acrylate, 2-methylbutyl acrylate, isoamyl acrylate, sec-butyl acrylate, n-butyl acrylate, 2-ethylhexyl acrylate, isodecyl methacrylate, t-butyl acrylate, t-butyl methacrylate, isobornyl acrylate, methylmethacrylate, isononyl acrylate, isodecyl acrylate, and the like, and any of these in any combination in any proportion. Some examples of alkyl (meth)acrylate monomers of particular interest include isooctyl acrylate, isononyl acrylate, isoamyl acrylate, isodecyl acrylate, 2-ethylhexyl acrylate, n-butyl acrylate, sec-butyl acrylate, and any combination of these in any proportion.

Non-exhaustive examples of suitable cationic unsaturated vinyl comonomers include various quaternary nitrogen functional (meth)acrylates. Some particular useful cationic unsaturated vinyl comonomers include [2-(methacryloyloxy)ethyl]trimethylammonium chloride (also referred to herein as "MOETAC") and [3-(methacryloylamino)propyl] trimethylammonium chloride (also referred to herein as "MAPTAC"). A single cationic unsaturated vinyl comonomer may be used. Alternatively, any combination of different cationic unsaturated vinyl comonomers may be used in any proportion. The total concentration of the cationic unsaturated vinyl comonomer(s) may be as low as about 0.1 parts by weight, and as high as about ten parts by weight, of the cationic unsaturated vinyl comonomer(s) per 100 parts by weight of all monomer(s) and comonomer(s) included in the reaction mixture.

MOETAC may be obtained from Aldrich Chemical Company of Milwaukee, Wis. MOETAC is also commercially available as the AGEFLEX™ FM1Q75MC product from Ciba Specialty Chemicals, Inc. of Besel, Switzerland. MAPTAC may also be obtained from Aldrich Chemical Company. MAPTEC is additionally commercially available from Rohm Tech, Inc. of Malden, Mass. as product number BM-613. Another suitable example of the cationic unsaturated vinyl comonomer is the triethylammonium functional variant of MOETAC that is commercially available from Rohm Tech, Inc. as product number BM-606.

Besides the cationic unsaturated vinyl comonomer(s), any other unsaturated vinyl comonomer(s) may optionally be incorporated during synthesis of the cationic microspheres. The total concentration of the optional unsaturated vinyl comonomer(s), if included, may be as low as about 0.1 parts by weight, and as high as about ten parts by weight, of the optional unsaturated vinyl comonomer(s) per 100 parts by weight of all monomer(s) and comonomer(s) included in the reaction mixture. The optional unsaturated vinyl comonomer(s) may include any of various nonpolar unsaturated vinyl comonomers, any of various ionic unsaturated vinyl comonomers, any of various polar unsaturated vinyl comonomers, and any combination of any of these in any proportion. Some non-exhaustive examples of these are:

(A) ionic unsaturated vinyl comonomers, such as sodium methacrylate, ammonium acrylate, sodium acrylate, trimethylamine p-vinyl benzimide, 4,4,9-trimethyl-4-azonia-7-oxo-8-oxa-dec-9-ene-1-sulphonate, N,N-dimethyl-N-(-methacryloxyethyl) ammonium propionate betaine, trimethylamine methacrylimide, 1,1-dimethyl-1(2,3-dihydroxypropyl)amine methacrylimide, any zwitterionic unsaturated vinyl monomer, and the like, and any combination of any of these in any proportion;

(B) non-polar unsaturated vinyl comonomers such as 4-methyl-2-pentyl acrylate; 2-methylbutyl acrylate; isoamyl acrylate; sec-butyl acrylate; n-butyl acrylate; isodecyl methacrylate; t-butyl acrylate; t-butyl methacrylate; isobornyl acrylate; octyl acrylamide; methylmethacrylate; isononyl acrylate; isodecyl acrylate; styrene; and the like; and any combination of any of these in any proportion;

(C) polar unsaturated vinyl comonomers such as acrylamide; methacrylamide; 2-hydroxyethyl acrylate; organic carboxylic acids containing unsaturated bonds and vinylic linkages, where the organic carboxylic acids comprise from 3 to about 12 carbon atoms and have generally 1 to about 4 carboxylic acid moieties; and any combination of any of these in any proportion. Nonlimiting examples of such organic carboxylic acids include acrylic acid, methacrylic acid, itaconic acid, carboxyethylacrylate, and the like, and any combination of any of these in any proportion.

Another class of suitable optional unsaturated vinyl comonomer(s) are amino-functional monomers having a nucleus (or a portion of the nucleus) with the general formula:

(1)

$$CH_2=CHR_1-\overset{O}{\underset{\|}{C}}-L-R_2-(NR_3R_4)_x, \text{ wherein:}$$

$R_1$ is $-H$, $-CH_3$, $-CH_2CH_3$, cyano or carboxymethyl;

$R_2$ is a hydrocarbyl radical comprising 1 to about 12 carbon atoms;

$R_3$ and $R_4$ are independently H or an alkyl group containing 1 to about 12 carbon atoms or an arylalkyl group or together form a cyclic or heterocyclic moiety;

L is a carbon-carbon bond, O, NH or S; and x is an integer of 1 to 3.

Nonlimiting examples of optional unsaturated vinyl comonomers according to formula (1) include N,N-dimethyl-aminoethyl(methyl)acrylate; N,N-dimethylamino propyl-(meth)acrylate; t-butylaminoethyl(methyl)acrylate; N,N-diethylaminoacrylate; and any combination of any of these in any proportion.

Another class of suitable optional unsaturated vinyl comonomer(s) comonomers have a nucleus (or a portion of the nucleus) with the general formula (2):

$R_1$ is H, —$CH_3$, —$CH_2CH_3$, cyano or carboxymethyl;
$R_2$ is a hydrocarbyl radical comprising 1 to about 12 carbon atoms;
$R_5$ is —O—, alkylene oxide comprising 1 to 5 carbon atoms, or phenoxy oxide, wherein the alkylene oxide includes any of —$CH_2O$—, —$CH_2CH_2O$—, or —$CH_2(CH)CH_3O$—, and the like;
$R_6$ is H, —$C_6H_4OH$, or —$CH_3$;
L is a carbon-carbon bond, O, NH or S; and
n is an integer, except that when $R_5$ is —O—, n is an integer of 1-3.

Nonlimiting examples of optional unsaturated vinyl comonomer(s) according to formula (2) include hydroxyethyl (meth)acrylate; glycerol mono(meth)acrylate; 4-hydroxybutyl (meth)acrylate; acrylate-terminated poly(ethylene oxide); methacrylate-terminated poly(ethylene oxide); methoxy poly(ethylene oxide) methacrylate; butoxy poly(ethylene oxide) methacrylate; acrylate-terminated poly(ethylene glycol); methacrylate-terminated poly(ethylene glycol); methoxy poly(ethylene glycol) methacrylate; butoxy poly(ethylene glycol) methacrylate; and any combination of any of these in any proportion.

Another class of suitable optional unsaturated vinyl comonomer(s) are amido-functional and have a nucleus (or a portion of the nucleus) with the general formula (3):

$R_1$ is H, —$CH_3$, —$CH_2CH_3$, cyano or carboxymethyl; and
$R_3$ and $R_4$ are independently H or an alkyl group containing 1 to about 12 carbons or an arylalkyl group or together form a cyclic or heterocyclic moiety.

One nonlimiting example of an optional unsaturated vinyl comonomer according to formula is N,N-dimethyl acrylamide.

Nonlimiting examples of other suitable optional unsaturated vinyl comonomer(s) that fall outside the above three classes but are within the scope of permissible comonomer(s) include (meth)acrylonitrile; furfuryl (meth)acrylate; tetrahydrofurfuryl (meth)acrylate; 2-vinyl pyridine; 4-vinyl pyridine; N-vinyl pyrrolidone; N-vinyl caprolactom acrylamide; and any combination of any of these in any proportion.

Examples of suitable catalyzation initiators include initiators that are normally suitable for free-radical polymerization of acrylate monomers. Examples of such initiators include thermally-activated initiators and photoinitiators. Some non-exhaustive examples of suitable thermally-activated initiators include azo compounds, hydroperoxides, peroxides, and any of these in any combination in any proportion. Some thermally-activated initiators of particular interest include the VAZO® 52 free radical azo initiator that is available in aqueous solution from E. I. DuPont de Nemours and Company of Wilmington, Del. and the 75 percent active benzoyl peroxide initiator that is commercially available as the LUCIDOL® 75 free radical initiator from Pennwalt Corporation (now Atochem North America, Inc.) of Philadelphia, Pa. The total concentration of the polymerization initiator(s) should be effective to catalyze polymerization of the various monomer(s) and comonomer(s) present in the reaction mixture and form the cationic microspheres. Typically, the total concentration of the polymerization initiator(s) may be as low as about 0.01 parts by weight, and as high as about two parts by weight, of the polymerization initiator(s) per 100 parts by weight of all monomer(s) and comonomer(s) included in the reaction mixture.

Suitable cationic surfactant(s) include various quaternary nitrogen functional compounds. One suitable cationic surfactant is cocoalkylmethyl-[polyoxyethylene(15)]ammonium chloride that is available as ETHOQUAD® C/25 cationic surfactant from Akzo Nobel Chemicals, Inc. of Chicago, Ill. Another particularly suitable cationic surfactant is octadecylmethyl-[poloxyethylene(15)]ammonium chloride that is commercially available as ETHOQUAD® 18/25 cationic surfactant from Akzo Nobel Chemicals, Inc. Besides these two particular cationic surfactants of interest, other suitable cationic surfactants include cetyldimethylbenzylammonium chloride, $C_{12}$-$C_{18}$ alkyl trimethlyammonium bromides, and $C_{12}$-$C_{18}$ alkyl trimethlyammonium chlorides.

Generally, the total concentration of all cationic surfactant(s) included in the reaction mixture may be as high as about 10 parts by weight of the cationic surfactant(s) per 100 parts by weight of the cationic microspheres. More typically, the total concentration of all cationic surfactant(s) in the reaction mixture will be as high as about 5 parts by weight of the cationic surfactant(s) per 100 parts by weight of the cationic microspheres. In applications of particular interest, the total concentration of all cationic surfactant(s) in the reaction mixture may be as low as about one part by weight, and as high as about three parts by weight, of the cationic surfactant(s) per 100 parts by weight of the cationic microspheres.

The polymeric stabilizer(s), if used, help stabilize the final polymerized droplets as the reaction mixture is transformed into the reaction product, and thereafter. Thus, the polymeric stabilizer(s) help stabilize and prevent agglomeration of the cationic microspheres. Furthermore, use of the polymeric stabilizer(s) may permit a reduced concentration of cationic surfactant in the reaction mixture than may otherwise be deemed desirable. Any suitable non-ionic polymeric stabilizer(s) and/or cationic polymeric stabilizer(s) that function to accomplish the polymerized droplet stabilization function and prevent agglomeration of the cationic microspheres may be used. Typically, the total concentration of all polymeric stabilizer(s) in the reaction mixture may be as low as about 0.1 part by weight, and as high as about three parts by weight, of the polymeric stabilizer(s) per 100 parts by weight of the cationic microspheres.

One example of a suitable cationic polymeric stabilizer of particular interest is a high molecular weight copolymer of MOETAC and acrylamide that is commercially available as the ROHAGIT® KF 720 cationic polymeric stabilizer from Rohm Tech. Inc. Other exemplary polymeric stabilizers include salts of polyacrylic acids of greater than 5,000 molecular weight average, such as ammonium, sodium, lithium, and potassium salts; carboxy-modified polyacrylamides; copolymers of acrylic acid and dimethylaminoethylmethacrylate, and the like; polymeric quaternary amines, such as quaternized polyvinyl pyrrolidone copolymers and quaternized amine-substituted cellulosic material; cellulosics and carboxy-modified cellulosics, such as the NATROSOL® CMC Type 7L sodium carboxy methylcellulose available from Hercules, Inc. of Wilmington, Del.; and polyvinyl alcohols.

Various chemicals substances, such as solvent(s), rheology agent(s), chain transfer agent(s), tackifying agent(s) and/or plasticizer(s), rheology modifier(s), antioxidant(s), and any combination of any of these, are some suitable examples of the optional modifier(s). Some types of modifiers will more typically be incorporated in the reaction mixture prior to synthesis of the cationic microspheres. For example, the reaction mixture may include any or all of various modifiers, such as rheology agent(s), chain transfer agent(s), solvent(s), and any of these in any combination, to beneficially optimize formation of the cationic microspheres or properties of the cationic microspheres. Other types of modifiers will more typically be incorporated after synthesis of the cationic microspheres, such as during compounding of the cationic microspheres to form the coating mixture (i.e., the repositionable pressure sensitive adhesive). No matter which, if any, modifier(s) are used, the amount of any such modifier(s) employed may generally be any amount effective for the known uses of such modifier(s).

One example of a particularly useful modifier for incorporation in the reaction mixture prior to formation of the cationic microspheres is the chain transfer agent. One or more chain transfer agents in any combination or proportion may be included in the reaction mixture. Chain transfer agents are useful for controlling the molecular weight of the polymers formed in the reaction product as the cationic microspheres. Many halogen-containing and sulfur-containing organic compounds function well as chain transfer agents in free radical polymerizations. Some non-exhaustive examples of such chain transfer agents are carbon tetrabromide, carbon tetrachloride, dodecandthiol, iso-octylthiglycolate, butyl mercaptan, and tertiary-dodecyl mercaptan, with long chain mercaptans, such as dodecanethiol being of particular interest. The total concentration of any chain transfer agent(s) included in the reaction mixture may generally be as high as about 0.15 parts by weight, more desirably as high as about 0.12 parts by weight, and still more desirably as high as about 0.08 parts by weight, per 100 parts by weight of all monomer(s) and comonomer(s) included in the reaction mixture.

Some examples of potential modifiers that may optionally be included in the coating mixture include solvent(s), tackifying agent(s), plasticizer(s), rheology modifier(s), antioxidant(s), and any combination of any of these in any proportion. For example, various rheology modifiers (thickeners) may be incorporated when compounding the purified cationic microsphere composition to form the coating mixture (i.e., the repositionable pressure sensitive adhesive).

Some non-exhaustive examples of suitable rheology modifiers include the ACRYSOL® RM-8 rheology modifier that is available from Rohm & Haas Company of Philadelphia, Pa. and the NATROSOL® 250 HHR water soluble hydroxyethyl cellulose product that is available from Hercules, Inc. Some exemplary tackifying agents and/or plasticisers include hydrogenated rosin esters that are commercially available from Hercules, Inc. under the FORAL® and REGALREZ® trade names. Some other useful tackifying agents include resins that are based on t-butyl styrene. Other useful plasticisers include, for example, dioctyl phthalate, 2-ethylhexyl phosphate, tricresyl phosphate, and the like. One suitable example of a useful antioxidant is the TI-Nox # WL antioxidant that is available from Technical Industries of Peace Dale, R.I. The amount of any such rheology modifier(s), tackifying agent(s), plasticiser(s), and/or antioxidant(s) employed in the repositionable PSA are amounts effective for the known uses of such additives.

In practice, repositionable pressure sensitive adhesive, as best depicted at 10 in the FIGURE, is applied via any coating technique onto a substrate 12, such as primed paper, to form a repositionable adhesive article 14 (i.e., a coated substrate). The cationic latex adhesive binder(s) help anchor the cationic microspheres to the repositionable adhesive article. Thus, the cationic latex adhesive binder(s), by helping anchor the cationic microspheres to the repositionable adhesive article, help assure that, upon removal of the repositionable adhesive article from an application surface, the repositionable pressure sensitive adhesive is removable from the application surface while minimizing the amount of adhesive residue that remains on the application surface.

Some preferred exemplary cationic latex adhesive binders are disclosed in U.S. patent application Ser. No. 10/052,032 entitled Pressure Sensitive Adhesives Having Quaternary Ammonium Functionality, Articles and Methods that was filed on Jan. 16, 2002 and published on Sep. 18, 2003 as publication number US20030175503A1. U.S. patent application Ser. No. 10/052,032 is assigned to the 3M Innovative Products Company of St. Paul, Minn. The entirety of U.S. patent application Ser. No. 10/052,032 is incorporated herein by reference. Though the cationic latex adhesive binders disclosed in U.S. patent application Ser. No. 10/052,032 are preferred, other cationic latex adhesive binders may be used without departing from the spirit and scope of the present invention.

The cationic latex adhesive binder(s) are included in the coating mixture at a concentration that is effective to help anchor the cationic microspheres to the repositionable adhesive article, while also helping assure that, upon removal of the repositionable adhesive article from an application surface, the repositionable pressure sensitive adhesive is removable from the application surface while minimizing any amount of adhesive residue left on the application surface. Generally, the total concentration of the cationic latex adhesive binder(s) in the coating mixture may be as high as about 50 parts by weight of the cationic latex adhesive binder(s) per 100 parts by weight of the cationic microspheres. More typically, the total concentration of the cationic latex adhesive binder(s) in the coating mixture will be as high as about 10 parts by weight of the cationic latex adhesive binder(s) per 100 parts by weight of the cationic microspheres. In applications of particular interest, the total concentration of the cationic latex adhesive binder(s) in the coating mixture may be as low as about one part by weight, and as high as about four parts by weight, of the cationic latex adhesive binder(s) per 100 parts by weight of the cationic microspheres.

Preparation of the repositionable pressure sensitive adhesive first entails synthesis of the cationic microspheres. Thereafter, the synthesized cationic microspheres, as present in the purified cationic microsphere composition following filtration of the reaction product, may be compounded with any additionally desired components to form the repositionable pressure sensitive adhesive. The repositionable pressure sensitive adhesive is characterized as "pressure sensitive", since application of pressure to the repositionable pressure sensitive adhesive during placement of the repositionable pressure sensitive adhesive against an application surface tends to cause enhanced contact between the cationic microspheres of the repositionable pressure sensitive adhesive and the application surface, due to the elastomeric nature of the cationic microspheres.

The cationic microspheres may be synthesized in a single step process that is detailed more fully below. The polymerization reaction proceeds within individual polymeric phases that exist in an aqueous reaction mixture of monomers and comonomers. In the one-step process, both the $C_4$-$C_{14}$ alkyl(meth)acrylate monomer(s), the cationic unsaturated vinyl comonomer(s), and any optional unsaturated vinyl comonomer(s) may be present together in the aqueous reaction mixture upon initiation of polymerization. Other components of the reaction mixture, such as polymerization initiator(s), cationic surfactant(s), any optional stabilizer(s), and any optional modifier(s) may also be incorporated in the reaction mixture, as detailed elsewhere herein.

The specific reaction conditions, such as reaction temperature profiles during the synthesis, depend on the particular types of monomer(s), comonomer(s), and catalyzation initiator(s) that are employed. Nonetheless, it is generally desirable to predisperse the reaction mixture to have an average monomer droplet size as low as about 1 micrometer to as high as about 300 micrometers and more desirably as low as about 20 micrometers to as high as about 1500 micrometers. The average monomer droplet size tends to decrease with increased and prolonged agitation of the reaction mixture.

Minimizing the presence of oxygen in the reaction mixture during polymerization is often desirable, since oxygen dissolved in the reaction mixture may inhibit polymerization of the monomers. Therefore, it is desirable to expel dissolved oxygen from the reaction mixture prior to and during the polymerization reaction. Although bubbling of an inert gas into the reaction vessel or through the reaction mixture is an effective deoxygenation technique, other deoxygenation techniques that are compatible with polymerization of the monomers and comonomers employed when practicing the present invention may be used. Typically, nitrogen is used to deoxygenate the reaction mixture, although any of the Group VIIIA (CAS version) inert gases are also suitable for deoxygenation.

A sufficient number of free radicals must be present in the reaction mixture to initiate monomer polymerization. Such free radicals may be obtained from the polymer initiator(s) by several techniques that are well known in the art, For example, heat may be applied to the reaction mixture to generate free radicals and initiate polymerization of the monomers. As another example, radiation may be applied to the reaction mixture to generate free radicals and initiate polymerization of the monomers. Due to the relative ease of simply heating the reaction mixture, application of heat to thermally decompose the catalyzation initiator(s) and generate sufficient numbers of free radicals is generally preferred for purposes of initiating the polymerization reaction. The temperature to which the reaction mixture is heated varies significantly, depending on the particular catalyzation initiator(s) employed. For many initiators, such as the VAZO® 52 polymerization, heating to a temperature of about 50° C. is adequate to initiate sufficient free radical generation.

One approach to the single step polymerization reaction entails combining the $C_4$-$C_{14}$ alkyl(meth)acrylate monomer(s) with the catalyzation initiator(s) in a first mixture that is uniformly and homogenous mixed and then held.

Likewise, the cationic unsaturated vinyl comonomer(s), deionized water, and cationic surfactant(s) are combined in a second mixture that is uniformly and homogenous mixed and then held.

In addition to the cationic unsaturated vinyl comonomer, any optional unsaturated vinyl comonomer(s) may additionally be included and uniformly blended into the first mixture or the second mixture. Also, any optional polymeric stabilizer(s) and any optional modifier(s) with a desired effect upon the polymerization reaction or upon the cationic microspheres, such as rheology agent(s), chain transfer agent(s), solvent(s), and the like, as well as any of these in any combination, may additionally be included and uniformly mixed into either the first mixture or the second mixture, as appropriate for particular modifier(s).

The first mixture and the second mixture are combined to form the reaction mixture. Stirring and an appropriate purge, such as a nitrogen purge, are maintained throughout the polymerization reaction, starting with formation of the reaction mixture. Free radical generation by the catalyzation initiator(s) is begun, by heating the reaction mixture, for example. The temperature profile of the reaction mixture is maintained for a predetermined period of time to support polymerization of the various monomer(s) and comonomer(s). As an example, after sufficient generation of free radicals has occurred and polymerization has begun, holding the reaction mixture at a temperature of about 75° C. for about four hours will generally support at least a substantial amount of polymerization of the monomer(s) and comonomer(s). After polymerization has preceded to a satisfactory degree, the resulting reaction product is cooled, such as to room temperature.

Following polymerization, the reaction product exists as a stable multi-phase aqueous suspension of the cationic microspheres at room temperature. The reaction product may have a non-volatile solids content as low as about 10 weight percent, and as high as about 70 weight percent, based on the total weight of the reaction product. The reaction product containing the multi-phase aqueous suspension of cationic microspheres is typically fairly stable against agglomeration and coagulation of the cationic microspheres and therefore may permissibly be utilized as adhesive immediately following polymerization. Due to the suitability of the reaction product, as-is, the reaction product is characterized herein as the intermediate adhesive composition.

Preferably, however, the reaction product is filtered to remove globular matter that is typically present in a very small amount prior to subsequent compounding of the cationic polymeric elastomeric microspheres with other agents that enhance the benefits of using the cationic microspheres in adhesive coatings. Any globular matter that is removed from the reaction product by filtration may include only globular matter with a nominal diameter or about 300 microns, or more, but more typically will include globular matter with a nominal diameter of about 200 microns, or more, to give the purified cationic microsphere composition a more uniform consistency.

The purified cationic microsphere composition will typically contain some residual amount of the fluidizing medium employed during synthesis of the cationic microspheres. At least some of this residual fluidizing medium will typically remain in, and be effective to support fluid application of, the repositionable pressure sensitive adhesive to substrates. The purified cationic microsphere composition may be, and typically will be, compounded with other agents that supplement the residual fluidizing medium to form the repositionable pressure sensitive adhesive. For example, the purified cationic microsphere composition may be combined with the cationic latex adhesive binder(s) that help securely anchor the cationic microspheres to the coated substrate. Additionally, various modifiers, such as rheology agent(s) that thicken the repositionable PSA and enhance the coating characteristics of the repositionable PSA may be combined with the purified cationic microsphere composition. Other modifiers, such as solvent(s), that enhance the coating characteristics of the repositionable PSA and antioxidant(s) that help chemically stabilize the repositionable PSA may also be combined with the purified cationic microsphere composition.

Other properties of the repositionable PSA may be altered by including other modifiers, such as tackifying agent(s) and/or plasticiser(s), in the repositionable PSA. Besides rheology modifier(s), adhesive binder(s), tackifying agent(s), and plasticiser(s), other modifiers or adjuvants, such as colorant(s), and filler(s), along with various other polymeric additives sometimes employed in repositionable PSAs may be included in the repositionable PSA of the present invention. Any such additional additive(s) or adjuvant(s) may be included in the repositionable PSA in an amount that is effective for the known uses of the particular additional additive(s) and/or adjuvant(s).

The repositionable PSA, after compounding of the purified cationic microsphere composition, may be coated onto any desired substrate, such as a backing material or other substrate, to form the repositionable adhesive article containing the repositionable pressure sensitive adhesive coating. Application of the repositionable PSA onto the substrate to create the repositionable pressure sensitive adhesive coating may be achieved using conventional adhesive coating methods, such as slot die coating techniques. Typically, the repositionable pressure sensitive adhesive coating, when dry, may exhibit a dry coating weight as low as about 0.2 grams per square foot (2.1 grams per square meter) of the applied repositionable PSA coating, and as high as about 2 grams per square foot (21.5 grams per square meter) of the applied repositionable PSA coating.

Backing materials that are used as substrates for the repositionable adhesive articles may be any material conventionally used for forming tape backings or repositionable note papers or may be various other exemplary flexible materials. For example, the backing material may be any paper, such as primed bond or primed copy paper, or any primed paper-based material. Generally, the backing material or other substrate used to form the repositionable adhesive article may be as thin as about 15 micrometers and as thick as about 155 micrometers, although backing materials or other substrates with thickness outside these values may permissibly be employed.

Other examples of suitable backing materials include woven and non-woven fabrics, metal, metallized polymeric films, and ceramic materials. Some examples of woven fabrics include fabric formed from threads of synthetic or natural materials; such as cotton, glass, ceramic material, and various plastics, such as nylon and rayon. Some examples of non-woven fabrics include air-laid webs of various natural or synthetic fibers, such as any of the fibers mentioned herein with respect to formation of woven fabrics.

Some additional non-exhaustive examples of suitable backing materials include backing materials made from various thermoplastic materials, such as polypropylene, polyethylene, polyvinyl chloride, polyester, polyamide, cellulose acetate, and ethyl cellulose. One exemplary polyester backing material is polyethylene terephthalate face stock, such as SCOTCH® film number 8050 that is available from 3M Company of St. Paul, Minn. One suitable polyamide backing material includes KAPTON® polyimide films available from E. I. DuPont de Nemours and Company.

Besides these exemplary thermoplastic materials, other examples of suitable backing materials include paper or similar substrates that are coated or laminated with these thermoplastic materials. Films formed from these thermoplastic materials, and papers or similar material coated with these thermoplastic materials, are often siliconized or otherwise treated to improve release characteristics. Any side(s) of the backing material may permissibly be siliconized or treated in a related fashion with a low adhesion backsize coating (also known as a "release coating") to improve release characteristics from the treated side of the backing material.

The low adhesion backsize coating helps prevent adjacent repositionable adhesive articles (such as repositionable adhesive sheets or repositionable adhesive notes) that include adhesive stripes of the repositionable PSA from sticking to each other. This feature is desirable to allow retrieval and separation of a first repositionable adhesive article from atop a second repositionable adhesive article, where the first repositionable adhesive article and the second repositionable adhesive article are included as part of a pad or stack of repositionable adhesive articles.

Absent use of the low adhesion backsize coating, the adhesive stripe of the repositionable PSA on the first repositionable adhesive article may adhere strongly to the second repositionable adhesive article and cause the second repositionable adhesive article and even subsequent repositionable adhesive articles beneath the second repositionable adhesive article to be retrieved from the pad or stack, when attempting to only retrieve the first repositionable adhesive article from the stack. The low adhesion backsize coating may be applied to portions of the second repositionable adhesive article that face the adhesive stripe of the first repositionable adhesive article to allow easier separation of the first repositionable adhesive article from the second repositionable adhesive article, despite the superior adhesion characteristics of the repositionable PSA. Likewise, the low adhesion backsize coating may be applied to portions of a third repositionable adhesive article that face the adhesive stripe of the second repositionable adhesive article to allow easier separation of the second repositionable adhesive article from the third repositionable adhesive article. This use of the low adhesion backsize coating may be continued for other repositionable adhesive articles present in the pad or stack beneath the first and second repositionable adhesive articles to allow easier separation of upper repositionable adhesive articles from subsequent repositionable adhesive articles within the pad or stack.

One exemplary coating for improving release characteristics is described in U.S. Pat. No. 5,032,460, which is hereby incorporated by reference in its entirety. Low adhesion backsize coatings for improving release characteristics will typically be applied to achieve a dry weight application of the low adhesion backsize as low as about 0.05 per square foot of the coated paper or other coated substrate (0.54 grams per square meter) and as high as about 0.1 grams per square foot (1.1 grams per square meter) of the coated paper or other coated substrate.

Some exemplary applications employing the repositionable pressure sensitive adhesive include repositionable note and paper products, repositionable tape and tape flag products, repositionable easel sheets, commercial graphics, wall papers, repositionable glue stick adhesives, and the like. The repositionable nature of the repositionable PSA 10 allows adhesive positioning of the repositionable adhesive article 14 on a first application surface 16 and subsequent repositioning of the repositionable adhesive article 14 onto different application surfaces, such as on a second application surface 18, as depicted in the FIGURE. Beyond the noted repositionable applications, other applications for the repositionable PSA include industrial, commercial and residential applications of the non-repositionable (permanent) type, due to the excellent adhesion characteristics of the repositionable PSA. The repositionable pressure sensitive adhesive incorporating the cationic microspheres may also be useful as an anti-bacterial or anti-microbial medical adhesive. Thus, other applications of the repositionable PSA may include medical adhesive products.

Articles coated with the cationic-microsphere-containing repositionable pressure sensitive adhesive adhere strongly to a wide variety of rough surfaces, textured surfaces, and other surfaces exhibiting challenging adhesion characteristics without prematurely detaching from these surfaces. Furthermore, the cationic microspheres included in the repositionable PSA have a cationic charge. Though not being bound to any particular theory, it is believed the cationic charge of the cationic microspheres included in the repositionable PSA is part of, and is permanently bound to, the individual cationic microspheres. It is believed the chemical component of the cationic microspheres that causes the cationic microspheres to carry the cationic charge is a structural portion of the cationic microspheres that is permanently and chemically bound within each and every cationic microspheres. The cationic microspheres are therefore believed to be unsusceptible to losing the cationic charge.

Thus, the cationic microspheres provide an electrostatic adhesive interaction with any application surface that carries an overall negative (anionic) charge. This electrostatic adhesive interaction allows repositionable PSAs incorporating the cationic microspheres to exhibit enhanced adhesion against application surfaces having an overall negative charge. Incorporation of other cationic components in the repositionable PSA of the present invention further improves adhesion of the repositionable PSA to such application surfaces.

The repositionable pressure sensitive adhesives of the present invention exhibit enhanced adhesion upon attachment to application surfaces with more challenging adhesion characteristics, such as rough surfaces, textured surfaces, and charged surfaces, as compared to existing repositionable pressure sensitive adhesives. Furthermore, the inventive repositionable pressure sensitive adhesives exhibit the enhanced adhesion while minimizing adhesive residue remaining on the application surfaces upon removal of repositionable adhesive articles that include the repositionable pressure sensitive adhesives. For example, referring to the FIGURE, when the repositionable adhesive article 14 that includes the repositionable pressure sensitive adhesive 10 is repositioned from the first application surface 16 to the second application surface 20, such repositioning typically occurs without leaving any visible residue (visible to the unaided eye of a human being) of the repositionable pressure sensitive adhesive 10 on the first application surface 16. More desireably, when the repositionable adhesive article that includes the repositionable pressure sensitive adhesive is repositioned from the first application surface to the second application surface, such repositioning occurs while leaving no, or essentially no, residue of the repositionable pressure sensitive adhesive on the first application surface.

Property Analysis and Characterization Procedures

Particle Size Determination

Unless otherwise stated, all particle size determinations presented herein for the cationic microspheres were made using a Horiba model number LA-910 laser scattering particle size distribution analyzer in accordance with the instructions provided with the analyzer for determining particle size. The Horiba LA-910 particle size distribution analyzer is commercially available from Horiba Instruments, Inc., which is based in Kyoto, Japan.

Characterization of Adhesion to Low Energy Surfaces

This test characterizes the ability of different repositionable adhesive articles, namely primed note papers containing a dried coating of a repositionable pressure sensitive adhesive, to remain adhered on a plastic low energy surface. In this test, samples of various substrates that include dried coatings of particular repositionable pressure sensitive adhesives are adhered to an application surface, specifically the plastic low energy surface. The plastic low energy surface used in this procedure is a model PF450XL privacy filtered for a computer monitor. The model PF450XL privacy filter is available from 3M Company.

Similarly sized adhesive articles with repositionable PSA coatings are adhered to the model PF450XL privacy filter. The coated areas of the adhesive articles where the repositionable PSA coatings being tested have been applied have about the same surface area. The adhesive articles are positioned on the model PF450XL privacy filter using similar application pressure. After the adhesive articles are positioned on the model PF450XL privacy filter, observations are made about how long the different adhesive articles remain adhered to the privacy filter before detachment, if any, occurs.

Static Angle Test

The static angle test measures the ability of different repositionable adhesive articles, namely primed note papers containing a dried coating of a repositionable pressure sensitive adhesive, to remain adhered on a standard test panel, while being subjected to removal pressure at a specified peel angle under constant load. Essentially, this static angle test is a quantitative procedure for measuring detachment resistance of repositionable adhesive articles having different repositionable PSA coatings.

In this static angle test, the different repositionable adhesive articles (i.e., repositionable adhesive note papers) are all the same size, namely about 33 mm wide and about 76 mm long. Each repositionable adhesive note paper sample includes an adhesive stripe (coating of repositionable PSA) that is about 18 mm wide and about 33 mm long, where the long dimension of each adhesive stripe is positioned along the short dimension of, and at the top of, each repositionable adhesive note paper sample. The adhesive stripe of a particular adhesive note paper sample is a dried coating of the particular repositionable PSA being evaluated.

The test panel used in this static angle test is a steel panel with a painted surface. Each repositionable note paper sample that is evaluated according to this procedure is applied to the painted surface of the steel panel with the long dimension of the adhesive stripe horizontally oriented and located at the top of the repositionable adhesive note paper sample. The particular repositionable adhesive note paper sample, after being applied to the painted surface of the steel panel, is pressure adhered to the painted surface by two passes of an application roller with an application pressure of about 1.5 pounds per square inch (77.6 millimeters of mercury).

The entire repositionable adhesive note paper sample containing the adhesive stripe is placed in a holder frame that is vertically-oriented approximately perpendicular to a ground surface. The painted surface of the steel panel is held at a 30° downward angle relative to the vertically-oriented holder frame. A 100 gram load is applied to the lower end of the repositionable adhesive note paper sample, proximate the lower end of the holder frame. A timer is started upon application of the 100 gram load to measure how long the repositionable adhesive note paper sample remains attached to the painted surface of the steel panel before the repositionable adhesive note paper detaches from the steel panel. This static angle test is ordinarily run to failure, i.e., until the repositionable adhesive note paper actually detaches from the steel panel. The time before detachment occurs may be measured in seconds.

EXAMPLES

The present invention is more particularly described in the following examples that are intended as illustrations only, since numerous modifications and variations within the scope of the present invention will be apparent to those skilled in the art.

Example 1

This example demonstrates synthesis of cationic microspheres, compounding of the synthesized cationic microspheres in a repositionable pressure sensitive adhesive, and application of a coating of the repositionable pressure sensitive adhesive on a substrate to form a repositionable adhesive article. In this example, isooctyl acrylate was employed as the $C_4$-$C_{14}$ alkyl(meth)acrylate monomer, and MOETAC was employed as the cationic comonomer. No unsaturated vinyl comonomer, other than the cationic unsaturated vinyl comonomer, was employed in the production of the cationic microspheres in this example. First, 343 grams of the isooctyl acrylate, 0.35 grams of the VAZO® 52 polymerization initiator, and 0.53 grams of the LUCIDOL® 75 polymerization initiator were combined and uniformly mixed in a 1,000 milliliter polyethylene beaker to form a first mixture. Then, a second mixture was formed in a two liter glass reaction flask that was fitted with a thermometer and a mechanical stirring apparatus. The glass reaction flask also included a nitrogen inlet tube so the reaction flask, when closed, could be maintained under a nitrogen blanket.

The second mixture included 354 grams of deionized water, 90 grams of a 12% aqueous solution of the ETHOQUAD® 18/25 cationic surfactant, and 24 grams of the MOETAC (as a 75 weight percent solids solution obtained from Aldrich Chemical Company) that were combined and uniformly mixed in the glass reaction flask. The aqueous solution of the ETHOQUAD® 18/25 cationic surfactant included 12 weight percent of the ETHOQUAD® 18/25 cationic surfactant and 88 weight percent water, based on the total weight of the aqueous solution of the cationic surfactant.

The first mixture from the polyethylene beaker was added to the second mixture in the two liter glass reaction flask to form a reaction mixture. The reaction mixture in the reaction flask was stirred for five minutes under a nitrogen blanket using the mechanical stirring apparatus that was operated at 400 revolutions per minute (RPM). After the five minute mixing period, the reaction mixture was heated to 50° C. and held for about 30 minutes at this 50° C. temperature until the reaction mixture exothermed to 75° C. The reaction mixture was then held at 75° C. for an additional four hours. The stirring at 400 RPM and maintenance of the nitrogen blanket were continued throughout the polymerization reaction period.

Upon completion of the four hour holding period at 75° C., the resulting reaction product was cooled to room temperature in the reaction flask. The reaction product was then filtered through cheesecloth to yield a multi-phase suspension containing about 45% weight percent solids. The solids content of this multi-phase suspension consisted predominately, if not entirely, of the cationic microspheres of the present invention. The 45% solids suspension was subjected to particle size analysis in accordance with the Particle Size Determination procedure in the Property Analysis and Characterization Procedure section of this document. The average particle size of the cationic microspheres was determined to be about 73 microns.

The cationic microspheres were then compounded to form a repositionable pressure sensitive adhesive in accordance with the present invention. First, 200 grams of the 45% solids suspension was placed in an eight ounce jar, with stirring using an overhead air mixer. Then, thirteen grams of a 25% aqueous solution of a cationic latex adhesive binder disclosed in U.S. patent application Ser. No. 10/052,032 was placed in the jar along with 0.5 grams of a 10 weight percent aqueous solution of the TI-Nox # WL antioxidant and 1.8 grams of the ACRYSOL® RM8 rheology modifier, while continuously stirring the contents of the jar.

The 25% aqueous solution of the cationic latex adhesive binder included 25 weight percent of the cationic latex adhesive binder and 75 weight percent water, based on the total weight of the 25% aqueous solution. The 10 weight percent solution of the TI-Nox #WL antioxidant, included 10 weight percent of the TI-Nox # WL antioxidant and 90 weight percent water, based on the total weight of the 10% aqueous solution.

A roll of primed bond paper that was 15.2 centimeters wide was pre-coated on a first side with low adhesion backsize that is described in U.S. Pat. No. 5,032,460. The compounded repositionable pressure sensitive adhesive containing the cationic microspheres was coated on a second side of the roll of primed bond paper to yield repositionable adhesive note paper containing an adhesive stripe of the repositionable pressure sensitive adhesive. The adhesive stripe, after drying, had a coating weight of about 0.75 grams of the repositionable pressure sensitive adhesive per square foot (8.1 grams per square meter) of the adhesive stripe. The repositionable adhesive note paper was later converted to 25.4 centimeter by 15.2 centimeter pads of the repositionable adhesive note paper that were thereafter cut to different sizes for testing.

Example 2

This example demonstrates synthesis of cationic microspheres, compounding of the synthesized cationic microspheres in a repositionable pressure sensitive adhesive, and application of a coating of the repositionable pressure sensitive adhesive on a substrate to form a repositionable adhesive article. In this example, isooctyl acrylate was employed as the $C_4$-$C_{14}$ alkyl(meth)acrylate monomer, MOETAC was employed as the cationic unsaturated vinyl comonomer, and N-vinyl pyrrolidone was employed as the optional unsaturated vinyl comonomer.

First, 328 grams of the isooctyl acrylate, nine grams of the N-vinyl pyrrolidone, 0.36 grams of the VAZO® 52 polymerization initiator, 0.54 grams of the LUCIDOL® 75 polymerization initiator, and 7.2 grams of a one percent solution of tertiary-dodecyl mercaptan were combined and uniformly mixed in a 1,000 milliliter polyethylene beaker to form a first mixture. The one percent solution of tertiary-dodecyl mercaptan included one weight percent tertiary-dodecyl mercaptan and 99 weight percent isooctyl acrylate, based on the total weight of the one percent solution. The tertiary-dodecyl mercaptan served as a chain transfer agent during subsequent monomer/comonomer polymerization.

A second mixture was then formed in a two liter glass reaction flask that was fitted with a thermometer and a mechanical stirring apparatus. The glass reaction flask also included a nitrogen inlet tube so the reaction flask, when closed, could be maintained under a nitrogen blanket.

The second mixture included 360 grams of deionized water, 90 grams of a 12% aqueous solution of the ETHOQUAD® 18/25 cationic surfactant, and 21.6 grams of the MOETAC (as a 75 weight percent solids solution obtained from Aldrich Chemical Company) that were combined and uniformly mixed in the glass reaction flask. The aqueous solution of the ETHOQUAD® 18/25 cationic surfactant included 12 weight percent of the ETHOQUAD® 18/25 cationic surfactant and 88 weight percent water, based on the total weight of the aqueous solution of the cationic surfactant.

The first mixture from the polyethylene beaker was added to the second mixture in the two liter glass reaction flask to form a reaction mixture. The reaction mixture in the reaction flask was stirred for five minutes under a nitrogen blanket using the mechanical stirring apparatus that was operated at 400 revolutions per minute (RPM). After the five minute mixing period, the reaction mixture was heated to 50° C. and held for about 30 minutes at this 50° C. temperature until the reaction mixture exothermed to 76° C. The reaction mixture was then held at 75° C. for an additional four hours. The stirring at 400 RPM and maintenance of the nitrogen blanket were continued throughout the polymerization reaction period.

Upon completion of the four hour holding period at 75° C., the resulting reaction product was cooled to room temperature in the reaction flask. The reaction product was then filtered through cheesecloth to remove a very small amount of globular matter and yield a multi-phase suspension containing about 45% weight percent solids. The solids content of this multi-phase suspension consisted predominately, if not entirely, of the cationic microspheres of the present invention. The 45% solids suspension was subjected to particle size analysis in accordance with the Particle Size Determination procedure in the Property Analysis and Characterization Procedure section of this document. The average particle size of the cationic microspheres was determined to be about 39 microns.

The cationic microspheres were then compounded to form a repositionable pressure sensitive adhesive in accordance with the present invention. First, 200 grams of the 45% solids suspension was placed in an eight ounce jar, with stirring using an overhead air mixer. Then, eight grams of a 25% aqueous solution (as described in Example 1) of the cationic latex adhesive binder was placed in the jar along with 0.5 grams of a 10 weight percent aqueous solution (as described in Example 1) of the TI-Nox # WL antioxidant and 0.25 grams of the NATROSOL® 250 HHR rheology modifier, while continuously stirring the contents of the jar.

The compounded repositionable pressure sensitive adhesive containing the cationic microspheres was then coated, as described in Example 1, on a roll of primed bond paper (coated with low adhesion backsize as described in Example 1) to yield repositionable adhesive note paper containing an adhesive stripe of the repositionable pressure sensitive adhesive. The adhesive stripe, after drying, had a coating weight of about 0.75 grams of the repositionable pressure sensitive adhesive per square foot (8.1 grams per square meter) of the adhesive stripe. The repositionable adhesive note paper was later converted to 25.4 centimeter by 15.2 centimeter pads of the repositionable adhesive note paper that were thereafter cut to different sizes for testing.

Testing of Repositionable Adhesive Note Papers of Examples 1 and 2

An adhesion to low energy surfaces test was conducted on some of the repositionable adhesive note papers coated with the inventive repositionable pressure sensitive adhesive produced in Examples 1 and 2 versus note paper samples coated with a commercially-employed repositionable PSA. The test consisted of the Static Angle Test procedure from the Property Analysis and Characterization Procedure section of this document.

The dried coating weights of the repositionable pressure sensitive adhesive prepared in Examples 1 and 2 and applied to the primed note papers as detailed in Examples 1 and 2 are detailed in Table 1 below. The dimensions of the repositionable adhesive note papers and of the adhesive stripes for the tested repositionable adhesive note papers are described in the Static Angle Test procedure.

The repositionable adhesive note paper of the Comparative Example (see Table 1) was prepared by coating primed note paper (i.e., primed bond paper) with the repositionable pressure sensitive adhesive used to prepare the HIGHLAND™ repositionable adhesive note paper that is available from 3M Company. The adhesive stripe of the repositionable adhesive note paper of the Comparative Example was applied in the same way as the adhesive stripes were applied to form the repositionable adhesive note papers in Examples 1 and 2, and the primed note paper of the Comparative Example included the low adhesion backsize, as described in Examples 1 and 2. The dimensions of the repositionable adhesive note papers and the adhesive stripes for the repositionable adhesive note papers of the Comparative Example were the same as the dimensions of the repositionable adhesive note papers and the adhesive stripes for the repositionable adhesive note papers of Examples 1 and 2.

The repositionable adhesive note papers of Examples 1 and 2 and of the Comparative Example were each subjected to the Static Angle Test procedure. The results for the repositionable adhesive note papers of Example 1, Example 2, and the Comparative Example are presented in Table 1 below. The numbers reported in Table 1 for each test are the average for six separate test specimens.

TABLE 1

| | Repositionable PSA Coating Weight (gsf*/gsm+) | Time Before Detachment During Static Angle Test (seconds) |
|---|---|---|
| Example 1 | 0.65/7.0 | 312 |
| Example 2 | 0.55/5.9 | 245 |

TABLE 1-continued

| | Repositionable PSA Coating Weight (gsf*/gsm+) | Time Before Detachment During Static Angle Test (seconds) |
|---|---|---|
| Example 2 | 0.75/8.1 | 410 |
| Comparative Example | 0.65/7.0 | 68 |

*: grams of the repositionable PSA per square foot of the adhesive stripe of the applied repositionable PSA
+: grams of the repositionable PSA per square meter of the adhesive stripe of the applied repositionable PSA These results of Table 1 illustrate the greatly enhanced adhesion exhibited by the repositionable pressure sensitive adhesive of the present invention, versus the adhesion exhibited by the existing repositionable pressure sensitive adhesive employed on HIGHLAND™ coated note papers. From Table 1, it is evident the elevated adhesion of the inventive repositionable pressure sensitive adhesives ranged from nearly four times greater to more than six times greater (as characterized by the static angle test), as compared to the adhesion of the existing repositionable pressure sensitive adhesive employed in the HIGHLAND™ coated note papers.

Examples 3-8

Examples 3-8 were conducted in accordance with the procedure of Example 2 to yield a 45% solids multi-phase suspension of the cationic microspheres, with the exception of the changes indicated in Table 2 below with respect to the cationic unsaturated vinyl comonomer, the cationic surfactant, the optional unsaturated vinyl monomer(s), and the chain transfer agent. The concentrations of these various components from Examples 1 and 2, if included, are also shown in Table 2. Furthermore, Table 2 includes particle size measurements for the cationic microspheres synthesized in Examples 1-8.

Examples 3-8, respectively. The repositionable adhesive note papers were later converted to 25.4 centimeter by 15.2 centimeter pads of the repositionable adhesive note papers that were thereafter cut to different sizes.

Testing of Repositionable Adhesive Note Papers of Example 3

A test was conducted on some of the repositionable adhesive note papers coated with the inventive repositionable pressure sensitive adhesive produced in Example 3 versus note paper samples coated with commercially-employed repositionable PSA. The test consisted of the Characterization Of Adhesion To Low Energy Surfaces procedure from the Property Analysis and Characterization Procedure section of this document.

In this adhesion to low energy surface test, two samples of repositionable adhesive note paper employing the repositionable PSA produced in Example 3 were used. In these samples employing the repositionable PSA produced in Example 3, the repositionable adhesive note papers each had an adhesive stripe of the repositionable PSA that was 18 milliliters wide and 7.62 centimeters long. The long dimension of the adhesive stripes were oriented along the upper edge of each repositionable adhesive note paper. The repositionable pressure sensitive adhesive on these two Example 2 repositionable adhesive note paper samples had a coating weight of 0.65 grams of the repositionable PSA per square foot (7.0 grams per square meter) of the adhesive stripe.

A comparative repositionable adhesive note paper coated with the repositionable pressure sensitive adhesive used to prepare the HIGHLAND™ repositionable adhesive note paper available from 3M Company was prepared. The adhesive stripe of the comparative repositionable adhesive note paper was applied in the same way as the adhesive stripes were applied to form the repositionable adhesive note papers of Example 3, and the comparative repositionable

TABLE 2

| Example Number | Cationic Unsaturated Vinyl Comonomer* | Cationic Surfactant* | Optional Unsaturated Vinyl Comonomer(s)* | Chain Transfer Agent* | Particle Size (microns) |
|---|---|---|---|---|---|
| 1 | 6.5% MOETAC | 2.5% ETHOQUAD ® 18/25 | None | None | 73 |
| 2 | 5.9% MOETAC | 3% ETHOQUAD ® 18/25 | 2.5% N-vinyl pyrrolidone | 0.02% t-DDM+ | 39 |
| 3 | 4.5% MOETAC | 3% ETHOQUAD ® 18/25 | 0.75% N-vinyl pyrrolidone | None | 81 |
| 4 | 4% MOETAC | 3% ETHOQUAD ® 18/25 | 2.5% Diethylamino-ethylacrylate | 0.005% t-DDM+ | 63 |
| 5 | 2.5% MOETAC | 3% ETHOQUAD ® 18/25 | 4% Arcylamide | 0.005% t-DDM+ | 64 |
| 6 | 4.5% MAPTAC | 3% ETHOQUAD ® 18/25 | 2.5% N-vinyl pyrrolidone | 0.02% t-DDM+ | 82 |
| 7 | 4.5% MOETAC | 3% ETHOQUAD ® C/25 | 2.5% N-vinyl pyrrolidone | 0.02% t-DDM+ | 124 |
| 8 | 4.5% MOETAC | 3% ETHOQUAD ® 18/25 | 3% n-Vinyl-Caprolactam 7% Octyl-Acrylamide | 0.02% t-DDM+ | 112 |

*all weight percentages are based on the total weight of all polymerizable monomers and comonomers in the reaction mixture
+tertiary-dodecyl mercaptan The cationic microspheres produced in Examples 3-8 were compounded in accordance with the compounding details provided in Example 2 to form various repositionable pressure sensitive adhesives in accordance with the present invention. The compounded repositionable pressure sensitive adhesives of Examples 3-8 were then coated, as described in Example 1 (but with varying dry coating weights), on a roll of primed bond paper (coated with low adhesion backsize as described in Example 1) to yield repositionable adhesive note papers containing adhesive stripes of the repositionable pressure sensitive adhesives of adhesive note paper included the low adhesion backsize, as described in Examples 1 and 2. The dimensions of the comparative repositionable adhesive note paper and of the adhesive stripe for the comparative repositionable adhesive note paper were the same as the dimensions of the repositionable adhesive note papers and of the adhesive stripes for the repositionable adhesive note papers of Example 3.

The repositionable adhesive note papers of Example 3 and the comparative repositionable adhesive note paper were subjected to the Characterization Of Adhesion To Low Energy Surfaces procedure. The result was the comparative repositionable adhesive note paper detached from the plastic surface of the privacy filter within 24 hours of being applied. On the other hand, the repositionable adhesive note papers of Example 3 remained firmly attached to the plastic surface of the privacy filter for more than six months. When the two repositionable adhesive note papers of Example 3 were thereafter repositioned, the two repositionable adhesive note papers of Example 3 removed cleanly from the plastic surface of the privacy filter, without leaving behind any visible (visible to the unaided eye of a human being) residue of the pressure sensitive adhesive.

Although the present invention has been described with reference to various embodiments, including several preferred embodiments, workers skilled in the art will recognize the changes may be made in form and detail to the disclosure herein withheld departing from the spirit and scope of the present invention.

The invention claimed is:

1. An adhesive composition, the adhesive composition comprising:
a plurality of cationic microspheres, wherein the cationic microspheres have a cationic charge that is permanently and individually bound to each cationic microsphere; and a fluidizing medium effective for supporting fluid application of the adhesive composition to a surface.

2. The adhesive composition of claim 1 wherein the cationic microspheres are derived in part from a cationic unsaturated vinyl monomer.

3. The adhesive composition of claim 1 wherein the cationic microspheres are derived in part from a $C_N$ alkyl (meth)acrylate monomer where N is any integer ranging from 4 to 14.

4. The adhesive composition of claim 1 wherein the cationic microspheres are derived in part from an unsaturated vinyl comonomer.

5. The adhesive composition of claim 1 wherein the adhesive composition further comprises a cationic latex adhesive binder.

6. The adhesive composition of claim 1 wherein the adhesive composition further comprises a cationic surfactant.

7. An adhesive article, the adhesive article comprising:
a substrate; and
a coating of the adhesive composition of claim 1 on the substrate, the adhesive composition effective to allow positioning of the adhesive article on a first application surface and repositioning of the adhesive article on a second application surface.

8. The adhesive article of claim 7 wherein the adhesive composition is effective to allow the repositioning of the adhesive article from the first application surface to the second application surface without leaving any visible residue of the pressure sensitive adhesive on the first application surface, the visible residue being any residue that is visible to the unaided eye of a human being.

9. A method of making an adhesive article, the method comprising applying a coating of the adhesive composition of claim 1 on a substrate to form the adhesive article, the adhesive composition effective to allow positioning of the adhesive article on a first application surface and repositioning of the adhesive article on different application surfaces.

10. A mixture, the mixture comprising polymerizable substances, the polymerizable substances comprising:
at least one $C_N$ alkyl(meth)acrylate monomer, where N is any integer ranging from 4 to 14; and
a cationic unsaturated vinyl comonomer.

11. The mixture of claim 10 wherein the at least one $C_N$ alkyl(meth)acrylate monomer comprises iso-octyl acrylate.

12. The mixture of claim 10 wherein the polymerizable substances further comprise an unsaturated vinyl comonomer.

13. A coating composition, the coating composition comprising:
cationic microspheres based on the mixture of claim 10; and
a cationic latex adhesive binder.

14. The coating composition claim 13 wherein the mixture further comprises a cationic surfactant.

15. The mixture of claim 10 wherein the mixture further comprises a cationic surfactant.

16. The mixture of claim 10 wherein the mixture further comprises a catalyzation initiator.

17. The mixture of claim 10 wherein polymerization of the polymerizable substances is effective to form cationic microspheres.

18. An adhesive, the adhesive comprising:
a polymerized product of polymerizable substances, the polymerized product adhesively repositionable between different application surfaces, the polymerizable substances comprising:
at least one $C_N$ alkyl(meth)acrylate monomer, where N is any integer ranging from 4 to 14; and
a cationic unsaturated vinyl comonomer.

19. The adhesive of claim 18 wherein the polymerized product comprises polymeric elastomeric microspheres that render the adhesive pressure sensitive.

20. The adhesive of claim 18 wherein the at least one $C_N$ alkyl(meth)acrylate monomer comprises iso-octyl acrylate.

21. The adhesive of claim 18 wherein the polymerizable substances further comprise an unsaturated vinyl comonomer.

22. The adhesive of claim 18 wherein the repositionable pressure sensitive adhesive further comprises a cationic latex adhesive binder.

23. The adhesive of claim 18 wherein the repositionable pressure sensitive adhesive further comprises a cationic surfactant.

24. The adhesive of claim 18 wherein the adhesive, when subjected to static angle testing on a surface of a painted steel panel, following coating of the adhesive as an adhesive stripe about 18 mm wide and about 33 mm long on a paper substrate at the rate of about 0.65 grams of the adhesive per square foot (7.0 grams per square meter) of the adhesive stripe, detaches from the surface of the painted steel panel about 300 seconds after being adhered to the surface of the painted steel panel.

25. The adhesive of claim 22 wherein the adhesive, when subjected to static angle testing on a surface of a painted steel panel, following coating of the adhesive as an adhesive stripe about 18 mm wide and about 33 mm long on a paper substrate at the rate of about 0.55 grams of the adhesive per square foot (5.9 grams per square meter) of the adhesive stripe, detaches from the surface of the painted steel panel about 240 seconds after being adhered to the surface of the painted steel panel.

26. An adhesive article, the adhesive article comprising:
a substrate; and
a coating of the adhesive of claim 18 on the substrate, the adhesive effective to allow positioning of the adhesive article on a first application surface and repositioning of the adhesive article on a second application surface.

27. The adhesive article of claim 26 wherein the adhesive composition is effective to allow the repositioning of the adhesive article from the first application surface to the second application surface without leaving any visible residue of the pressure sensitive adhesive on the first application surface, the visible residue being any residue that is visible to the unaided eye of a human being.

28. A method of making an adhesive composition, the method comprising:
causing a plurality of cationic microspheres, wherein the cationic microspheres have a cationic charge that is permanently and individually bound to each cationic microsphere, to exist in a fluidizing medium to yield the adhesive composition, the fluidizing medium effective for supporting fluid application of the adhesive composition to a surface.

29. The method of claim 28 wherein the cationic microspheres are derived in part from a $C_N$ alkyl(meth)acrylate monomer where N is any integer ranging from 4 to 14.

30. The method of claim 28 wherein the cationic microspheres are derived in part from an unsaturated vinyl comonomer.

31. The method of claim 28, the method further comprising incorporating a cationic latex adhesive binder in the adhesive composition.

32. The method of claim 31, the method further comprising incorporating a cationic surfactant in the adhesive composition.

33. The method of claim 28, the method further comprising incorporating a cationic surfactant in the adhesive composition.

34. An adhesive article, the adhesive article comprising:
a substrate; and
a coating of the adhesive composition prepared in claim 28 on the substrate, the adhesive composition effective to allow positioning of the adhesive article on a first application surface and repositioning of the adhesive article on a second application surface.

35. The adhesive article of claim 34 wherein the adhesive composition is effective to allow the repositioning of the adhesive article from the first application surface to the second application surface without leaving any visible residue of the adhesive composition on the first application surface, the visible residue being any residue that is visible to the unaided eye of a human being.

36. A method of making adhesive cationic microspheres, the method comprising:
initiating reaction of a polymerizable mixture to form the adhesive cationic microspheres, the polymerizable mixture comprising:
at least one $C_N$ alkyl(meth)acrylate monomer, where N is any integer ranging from 4 to 14; and
a cationic unsaturated vinyl comonomer.

37. The method of claim 36 wherein the at least one $C_N$ alkyl(meth)acrylate monomer comprises iso-octyl acrylate.

38. The method of claim 36 wherein the polymerizable mixture further comprises an unsaturated vinyl comonomer.

39. The method of claim 36 wherein initiating reaction of the polymerizable mixture comprises:
including a catalyzation initiator in the polymerizable mixture; and
triggering catalyzation initiation by the catalyzation initiator.

40. The method of claim 39 wherein triggering catalyzation initiation by the catalyzation initiator comprises warming the catalyzation initiator to cause free radical generation by the catalyzation initiator.

41. The method of claim 36, the method further comprising including a cationic surfactant in the polymerizable mixture.

42. A method of using the adhesive cationic microspheres of claim 36, the method comprising uniformly mixing the adhesive cationic microspheres with a cationic latex adhesive binder to form an adhesive composition.

43. The method of claim 42, the method further comprising including a cationic surfactant in the polymerizable mixture.

44. The method of claim 43, wherein the adhesive composition, when subjected to static angle testing on a surface of a painted steel panel, following coating of the adhesive composition as an adhesive stripe about 18 mm wide and about 33 mm long on a paper substrate at the rate of about 0.65 grams of the adhesive composition per square foot (7.0 grams per square meter) of the adhesive stripe, detaches from the surface of the painted steel panel about 300 seconds after being adhered to the surface of the painted steel panel.

45. A method of using the adhesive cationic microspheres of claim 38, the method comprising uniformly mixing the adhesive cationic microspheres with a cationic latex adhesive binder to form an adhesive composition.

46. The method of claim 45, the method further comprising including a cationic surfactant in the polymerizable mixture.

47. The method of claim 46, wherein the adhesive composition, when subjected to static angle testing on a surface of a painted steel panel, following coating of the adhesive composition as an adhesive stripe about 18 mm wide and about 33 mm long on a paper substrate at the rate of about 0.55 grams of the adhesive composition per square foot (5.9 grams per square meter) of the adhesive stripe, detaches from the surface of the painted steel panel about 240 seconds after being adhered to the surface of the painted steel panel.

48. An adhesive article, the adhesive article comprising:
a substrate; and
a coating of the adhesive composition prepared in claim 42 on the substrate, the adhesive composition effective to allow positioning of the adhesive article on a first application surface and repositioning of the adhesive article on a second application surface.

49. The adhesive article of claim 48 wherein the adhesive composition is effective to allow the repositioning of the adhesive article from the first application surface to the second application surface without leaving any visible residue of the pressure sensitive adhesive on the first application surface, the visible residue being any residue that is visible to the unaided eye of a human being.

* * * * *

UNITED STATES PATENT AND TRADEMARK OFFICE
CERTIFICATE OF CORRECTION

PATENT NO.         : 7,300,700 B2
APPLICATION NO. : 10/725634
DATED                 : November 27, 2007
INVENTOR(S)       : Andrew J. Callinan It is certified that error appears in the above-identified patent and that said Letters Patent is hereby corrected as shown below:

Column 19-20
Line 9, column 4, Table 2, delete "Arcylamide" and insert -- Acrylamide --, therefor.
Line 9, column 4, Table 2, delete "n-Vinyl" and insert -- N-vinyl --, therefor.

Column 22
Line 11, claim 14, after "composition" insert -- of --.

Signed and Sealed this

Thirteenth Day of May, 2008

JON W. DUDAS
*Director of the United States Patent and Trademark Office*